(12) United States Patent
Hac (10) Patent No.: US 6,904,351 B1
(45) Date of Patent: Jun. 7, 2005

(54) OPERATING A VEHICLE CONTROL SYSTEM

(75) Inventor: Aleksander B. Hac, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/802,222

(22) Filed: Mar. 17, 2004

(51) Int. Cl.$^7$ ................................................. G06G 7/76
(52) U.S. Cl. ............................ 701/70; 701/37; 180/197
(58) Field of Search ................................ 180/197, 409, 180/410, 421; 701/70, 71, 72, 73, 80, 90, 91, 1, 36, 37, 38, 41, 42; 303/140, 143, 149, 150, 189

(56) References Cited

U.S. PATENT DOCUMENTS

| | | | | |
|---|---|---|---|---|
| 5,742,918 A | * | 4/1998 | Ashrafi et al. | 701/70 |
| 6,163,747 A | * | 12/2000 | Matsuno | 701/80 |
| 6,308,126 B2 | * | 10/2001 | Yokoyama et al. | 701/70 |
| 6,424,907 B1 | | 7/2002 | Rieth et al. | |
| 6,498,976 B1 | * | 12/2002 | Ehlbeck et al. | 701/70 |
| 6,549,842 B1 | | 4/2003 | Hac et al. | |
| 6,593,849 B2 | | 7/2003 | Chubb et al. | |
| 6,684,140 B2 | * | 1/2004 | Lu | 701/37 |
| 6,745,112 B2 | * | 6/2004 | Mori | 701/1 |
| 6,799,092 B2 | * | 9/2004 | Lu et al. | 701/1 |

OTHER PUBLICATIONS

U.S. Appl. No. 10/440,604, filed May 19, 2003, Hac et al.

* cited by examiner

Primary Examiner—Richard M. Camby
(74) Attorney, Agent, or Firm—Michael D. Smith (57) ABSTRACT

The invention provides a method, a computer usable medium including a program, and a system for operating a vehicle control system. A plurality of measured vehicle variables is determined. At least one suspension force is determined based on at least one of the determined measured vehicle variables. At least one tire vertical force is determined based on the at least one determined suspension force and at least one of the determined measured vehicle variables. At least one tire longitudinal force is determined based on at least one of the determined measured vehicle variables. At least one axle lateral force is determined based on at least one of the determined measured vehicle variables. At least one tire lateral force is determined based on the at least one determined axle lateral force and the at least one determined tire vertical force. At least one control component of the vehicle control system is modulated based on the at least one determined tire vertical force, the at least one determined tire longitudinal force, and the at least one determined tire lateral force.

18 Claims, 7 Drawing Sheets

OPERATING A VEHICLE CONTROL SYSTEM

TECHNICAL FIELD OF THE INVENTION

The present invention relates generally to motor vehicles. More particularly, the invention relates to a strategy for operating a vehicle stability control system.

BACKGROUND OF THE INVENTION

The dynamics of ground vehicles are largely determined by forces between its tires and the road. Knowledge of these forces is beneficial for most active vehicle control systems. Several strategies have been developed for estimating tire forces in three axes (e.g., longitudinal, lateral, and vertical). For example, it has been reported that the measurement of deformation of a magnetized tire may be used to determine estimates of tire longitudinal and lateral forces. This strategy may have several shortcomings including the need for transmission of data from a rotating tire, a requirement of an excessive amount of data processing, and a lack of robustness due to a need for using tire stiffness characteristics in relating tire forces to measured deformation. The tire stiffness characteristics may further be complicated by variations in pressure, rotation speed, and temperature.

One strategy for estimating tire vertical forces using inertial sensors is disclosed in U.S. Pat. No. 6,593,849 issued Jul. 15, 2003 to Chubb, et al. A two wheel lift off condition (i.e., when the vertical force on two tires of the same side of vehicle is zero) may be detected thereby indicating a danger of vehicle rollover. The strategy disclosed by the '849 patent, however, is limited to a calculation of vertical tire forces and therefore does not provide a determination of longitudinal and lateral forces.

In U.S. Pat. No. 6,549,842 issued Apr. 15, 2003 to Hac, et al., a strategy for estimating a surface coefficient of adhesion for each wheel is disclosed, which involves a determination of tire dynamic forces. This strategy, however, does not account for the effects of vehicle body pitch and roll dynamics or wheel vertical dynamics, which may limit the accuracy of estimates under dynamic conditions (e.g., driving on a rough road). Moreover, tire forces are calculated from models that depend on several variables (e.g., tire longitudinal slip, tire sideslip angle, and surface coefficient of adhesion), which cannot be measured directly (at a reasonable cost) and are difficult to estimate with precision.

Therefore, it would be desirable to provide a strategy for operating a vehicle control system based on determined dynamic tire forces that overcomes the aforementioned and other disadvantages.

SUMMARY OF THE INVENTION

A first aspect of the present invention provides a method of determining dynamic tire forces. A plurality of measured vehicle variables is determined. At least one suspension force is determined based on at least one of the determined measured vehicle variables. At least one tire vertical force is determined based on the at least one determined suspension force and at least one of the determined measured vehicle variables. At least one tire longitudinal force is determined based on at least one of the determined measured vehicle variables. At least one axle lateral force is determined based on at least one of the determined measured vehicle variables. At least one tire lateral force is determined based on the at least one determined axle lateral force and the at least one determined tire vertical force. At least one control component of the vehicle control system is modulated based on the at least one determined tire vertical force, the at least one determined tire longitudinal force, and the at least one determined tire lateral force.

A second aspect of the invention provides a computer usable medium including a program for determining dynamic tire forces. The computer usable medium includes computer readable program code for: determining a plurality of measured vehicle variables; determining at least one suspension force based on at least one of the determined measured vehicle variables; determining at least one tire vertical force based on the at least one determined suspension force and at least one of the determined measured vehicle variables; and determining at least one tire longitudinal force based on at least one of the determined measured vehicle variables. The computer usable medium further includes computer readable program code for: determining at least one axle lateral force based on at least one of the determined measured vehicle variables; determining at least one tire lateral force based on the at least one determined axle lateral force and the at least one determined tire vertical force; and modulating at least one control component of the vehicle control system based on the at least one determined tire vertical force, the at least one determined tire longitudinal force, and the at least one determined tire lateral force.

A third aspect of the invention provides a system for determining dynamic tire forces. The system includes means for: determining a plurality of measured vehicle variables; determining at least one suspension force based on at least one of the determined measured vehicle variables; determining at least one tire vertical force based on the at least one determined suspension force and at least one of the determined measured vehicle variables; and determining at least one tire longitudinal force based on at least one of the determined measured vehicle variables. The system further includes means for: determining at least one axle lateral force based on at least one of the determined measured vehicle variables; determining at least one tire lateral force based on the at least one determined axle lateral force and the at least one determined tire vertical force; and modulating at least one control component of the vehicle control system based on the at least one determined tire vertical force, the at least one determined tire longitudinal force, and the at least one determined tire lateral force.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PRESENTLY PREFERRED EMBODIMENTS

Figure 1:
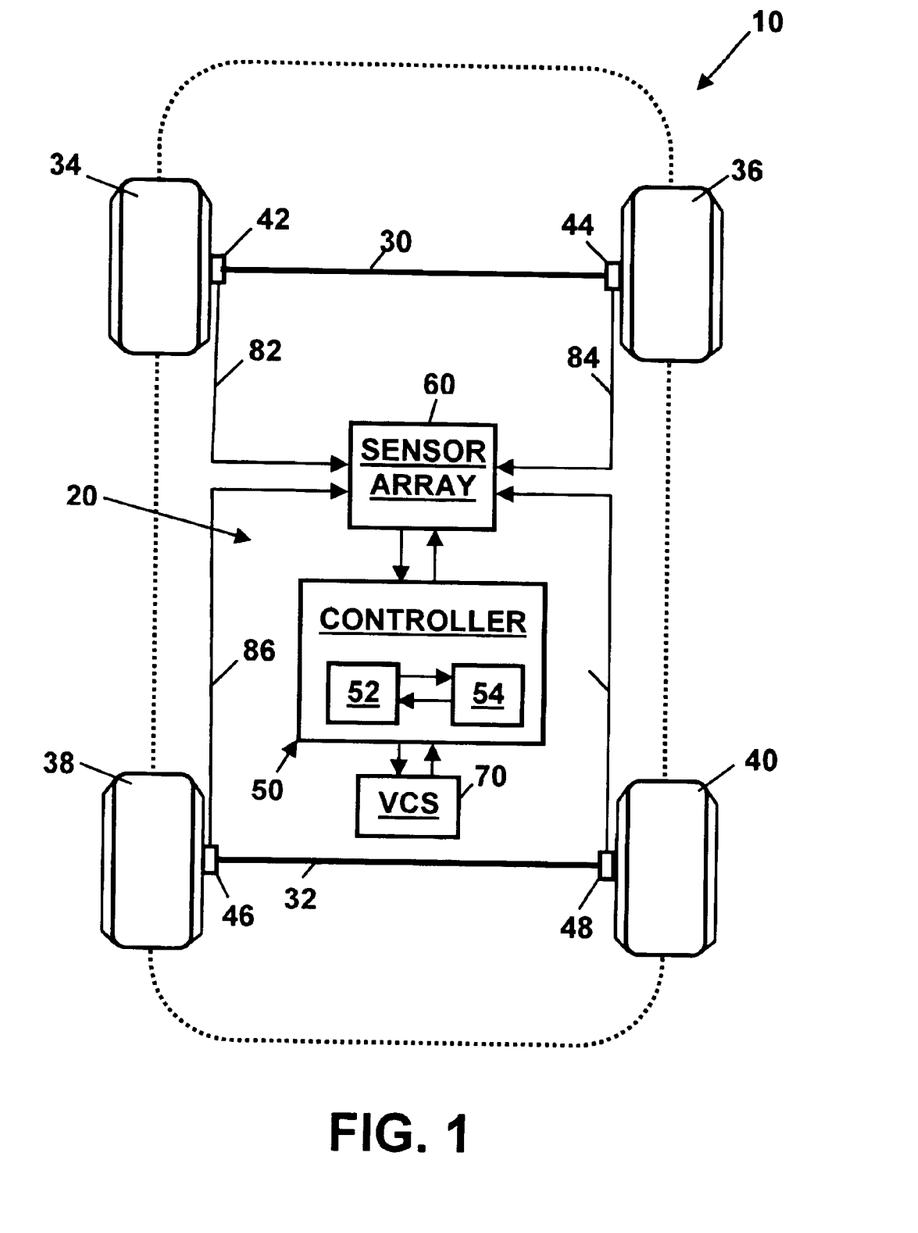
FIG. 1 is a schematic view of a vehicle including a system for operating a vehicle control system in accordance with the present invention.

Referring to the drawings, wherein like reference numerals refer to like elements, FIG. 1 is a schematic view of a vehicle, shown generally by numeral 10, with a system 20 for determining dynamic tire forces in accordance with the present invention. Those skilled in the art will recognize that the vehicle 10 and system 20 may include a number of alternative designs and may be employed in a variety of applications. For example, as will be described below, the vehicle 10 may include various sensor "packages" as part of different system 20 embodiments.

In one embodiment, the vehicle 10 may include two axles 30, 32, each flanked by wheels 34, 36, 38, 40. Vehicle 10 may further include a controller 50 including a digital microprocessor 52 for executing an algorithm for determining dynamic tire forces in accordance with the present invention. Controller 50 may be programmed to process a plurality of input signals received from a sensor array 60 and a vehicle control system (VCS) 70. Further, the controller 50 may provide output signals to the sensor array 60 and VCS 70, which may be used for modulating (i.e., enhance or otherwise control in an advantageous manner) the performance of various chassis control algorithms. In one embodiment, the VCS 70 may modulate various systems including, but not limited to, a chassis controllable suspension, an anti-lock braking system (ABS), a traction control system (TCS), a vehicle stability enhancement system (VSE), an active rear steering system, and an anti-rollover system. Those skilled in the art will appreciate that the VCS 70 may modulate numerous factors influencing vehicle comfort, handling, stability, and various other factors based on the determined tire forces.

The methods, algorithms, integration of data, and determinations (e.g., calculations and estimations), of the presently preferred embodiments, including those based on equations or value tables, may be performed by a device such as the microprocessor 52. Additional sensors 42, 44, 46, 48 may be optionally positioned within or associated with the wheels 34, 36, 38, 40 and/or vehicle 10 suspension for determining wheel 34, 36, 38, 40 speed, vertical acceleration, and other information. This information may be communicated to the sensor array 60 as denoted by the arrows 82, 84, 86, 88.

The computer usable medium including a program for operating the VCS 70 and program code associated with the presently preferred embodiments may be read into and stored in a memory portion 54 (e.g., ROM, RAM, and the like) for access by the microprocessor 52, as understood in the art. Furthermore, value tables, variables, parameters, and other numerical data may be stored as necessary in the memory portion 54. Analog signal processing may be provided for some of the input signals received by the controller 50. For example, the information sent from the sensor array 60 may be low-pass filtered through analog filter(s) to reduce signal noise.

For simplicity, the various sensors comprising the sensor array 60 are shown as a composite unit positioned at or near a center of gravity of the vehicle 10. Depending on the nature of the vehicle 10, the sensor array 60 may comprise a variety of individual sensors including, but not limited to, those sensing longitudinal, lateral, and vertical (a.k.a. normal) body accelerations, steering angle, roll rate, pitch rate, yaw rate, and wheel brake and drive torques (in addition to the wheel speed and vertical wheel acceleration information received by the wheel sensors 42, 44, 46, 48). Those skilled in the art will recognize that the various sensors may be substituted, added, or reconfigured to determine dynamic tire forces. The inventor contemplates a wide variety of sensor "packages" that may be used to effectively determine dynamic tire force in accordance with the present invention. Further, the positioning of the individual sensors and/or sensor array 60 may vary within the vehicle 10 and are not necessarily limited to placement at or near the vehicle 10 center of gravity as shown.

Figure 2:
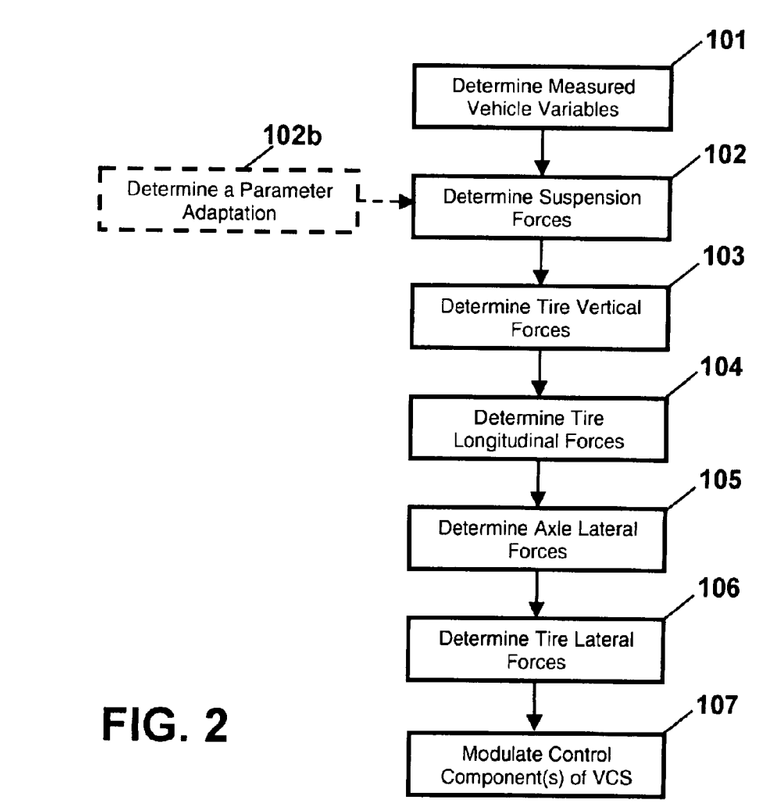
FIG. 2 is a flow diagram of an algorithm for determining dynamic tire forces in accordance with the present invention.

FIG. 2 is a flow diagram of an algorithm for determining dynamic tire forces in accordance with the present invention. The algorithm may be implemented by the controller 50 shown in FIG. 1 and may provide means for estimating tire forces in longitudinal, lateral, and vertical directions using primarily inertial sensors located in the sensor array 60 and (optionally) the wheels 34, 36, 38, 40. In addition, wheel speed and estimates of brake and drive torques may be used primarily in determination of tire longitudinal forces. The algorithm may be derived from equations of vehicle 10 vertical and lateral dynamics and the wheel 34, 36, 38, 40 rotary dynamics. In addition to measured variables, vehicle 10 parameters may be used. As some of the inertial parameters of the vehicle 10 may vary to some degree with payload, additional parameter adaptation algorithms may be implemented to improve accuracy of the algorithm.

Tire vertical forces may be determined using measured longitudinal, lateral, and vertical accelerations of the vehicle 10 body, and the roll, pitch, and yaw rates. In addition, an estimate of vehicle 10 speed may be used to determine the influence of aerodynamic lift force and pitch moment. If a higher accuracy is desired, vertical accelerations of the wheels 34, 36, 38, 40 or relative velocities/positions of the wheels 34, 36, 38, 40 with respect to the vehicle 10 body may also be used, depending on which sensors are available. Longitudinal tire forces may be determined from wheel 34, 36, 38, 40 speeds, estimates of brake and driving torques, and, optionally, tire vertical forces. The tire lateral forces may be determined using primarily lateral acceleration, yaw rate, and tire vertical forces, and, optionally, tire longitudinal forces and steering angle, if the latter are available.

In one embodiment, the algorithm provides a strategy for estimating dynamic tire forces in three axes (e.g., longitudinal, lateral, and vertical). Those skilled in the art will recognize that the aforementioned three directions are relative and may vary slightly due to the orientation of the vehicle 10, road, wheels 34, 36, 38, 40, etc. Ideally, the estimation of the dynamic tire forces may be obtained from relatively inexpensive sensors as part of the sensor array 60 and, optionally, associated with wheel 34, 36, 38, 40 drivetrain and brake systems. This information may be obtained from inertial sensors (e.g., accelerometers and rate sensors), and in the case of brake torque, their estimates may be provided by brake and power train controllers (not shown). The algorithm is at least partially based on the knowledge of vehicle 10 inertial parameters (e.g., masses and moment of inertia) and the location of the vehicle 10 center of gravity.

For most vehicles, these parameters do not vary much with payload. However, the accuracy of the algorithm may be improved if the vehicle payload condition is estimated via a parameter adaptation algorithm. Such adaptation algorithms have been previously disclosed. For example, in U.S. patent application Ser. No. 10/440,604 filed May 19, 2003 by Hac et al., a recursive algorithm is disclosed for estimating vehicle payload condition using information from roll rate and lateral acceleration sensors (or pitch rate and longitudinal acceleration information). In U.S. Pat. No. 6,424,907 issued Jul. 23, 2003 to Rieth, et al., corrections to a vehicle center of gravity location (from the nominal values) are determined using information from longitudinal and lateral acceleration and static suspension deflection sensors or pressure sensors in air spring of self-leveling suspensions (if available).

Figure 3A:
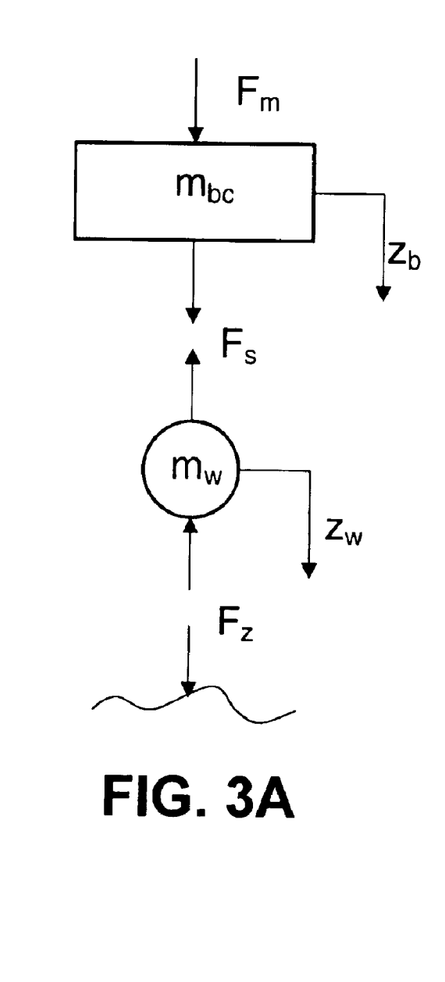
FIG. 3A illustrates a quarter-car model with forces acting in a vertical direction on a vehicle body and wheel.
Figure 3B:
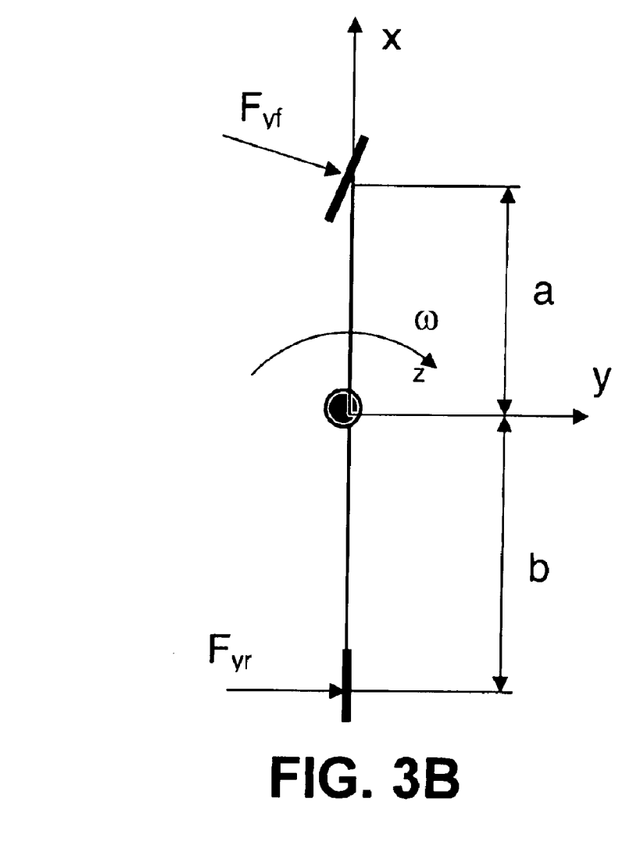
FIG. 3B illustrates lateral forces acting on a vehicle represented as a bicycle model.

Several key concepts of the algorithm are illustrated in FIGS. 3A and 3B. FIG. 3A illustrates a quarter-car model with forces acting in a vertical direction on a vehicle body and wheel. Here $m_{bc}$ represents the body (sprung) mass (per corner), $m_w$ the unsprung (wheel) mass, $F_s$ is the suspension force, $F_z$ is the tire vertical force and $F_m$ represents the forces acting directly on the vehicle body (other than the suspension force), such as inertial forces due to braking/accelerating or cornering and aerodynamic lift force. The equations of motion of the body and the wheel may be expressed as:

$$m_{bc}a_{zb} = F_m + F_s$$
$$m_w a_{xw} = -F_s - F_z \quad (1)$$

where $a_{zb}$ and $a_{zw}$ are the measured accelerations of the body and the wheel, respectively. They include components of gravity acceleration. That is, on level road:

$$a_{zb} = \ddot{z}_b - g$$
$$a_{zw} = \ddot{z}_b - g \quad (2)$$

where $\ddot{z}_b$ and $\ddot{z}_w$ are the vertical accelerations of body and wheel, respectively. The equations (1) can be solved for an unknown vertical load, $F_z$. This yields:

$$F_z = F_m - m_{bc}a_{zb} - m_w a_{zw} \quad (3)$$

When the vehicle is at rest on level road, $F_m=0$ and $a_{zb}=a_{zw}=-g$. Consequently, $F_z=(m_b+m_w)g$, which is the vertical force, is equal to the static load. Thus, the vertical force calculated from equation (3) includes the static load, as well as dynamic loads due to inertial forces resulting from road inputs and vehicle maneuvers. Also, the effect of road inclinations on vertical force is included in measured vertical accelerations. There is no requirement to measure suspension force. This concept may be extrapolated to a full car model.

If an accelerometer measuring wheel vertical acceleration is not available, the last term in equation (3) may be ignored and the quarter body mass replaced by a quarter vehicle mass, to account for the weight of the wheel. This yields:

$$F_z = F_m - v_c a_{zb} \quad (3b)$$

If, however, a measurement of relative velocity between the wheel and the body is available (this can be measured directly or obtained by differentiation of suspension deflection measurement), $v_{rel} = v_{zw} - v_{zb}$, then the wheel acceleration may be expressed as:

$$a_{zw} = \dot{v}_{rel} + a_{zb} \quad (4)$$

and this value substituted into equation (3).

FIG. 3B illustrates lateral forces acting on a vehicle represented as a bicycle model. Assuming a small steering angle, the equations of motion in the yaw plane may be expressed as:

$$ma_y = F_{yf} + F_{yr}$$
$$I_{zz}\dot{\omega}_x = F_{yf}a - F_{yr}b \quad (5)$$

where m is the total mass of vehicle, $I_{zz}$ is vehicle moment of inertia about the vertical axis, $F_{yf}$ and $F_{yr}$ are the front and rear axle lateral forces per axle, ay is measured lateral acceleration (which includes the gravity component due to road inclination), $\dot{\omega}_z$ is the yaw acceleration, and a and b are the distances of vehicle center of mass to front and rear axle, respectively. The equations (5) may be solved for the lateral forces (per axle), yielding:

$$F_{yf} = \frac{mba_y + I_{zz}\dot{\omega}_z}{L}, \quad F_{yf} = \frac{maa_y - I_{zz}\dot{\omega}_z}{L} \quad (6)$$

where L=a+b is vehicle wheelbase. On a uniform surface, the lateral forces may be distributed between left and right tires approximately in proportion to the corresponding vertical forces. If a higher accuracy is desired, the effects of differential braking and steering angle may be incorporated into equations (5) and (6). This may require measurement of the steering angle and tire longitudinal forces.

Figure 4:
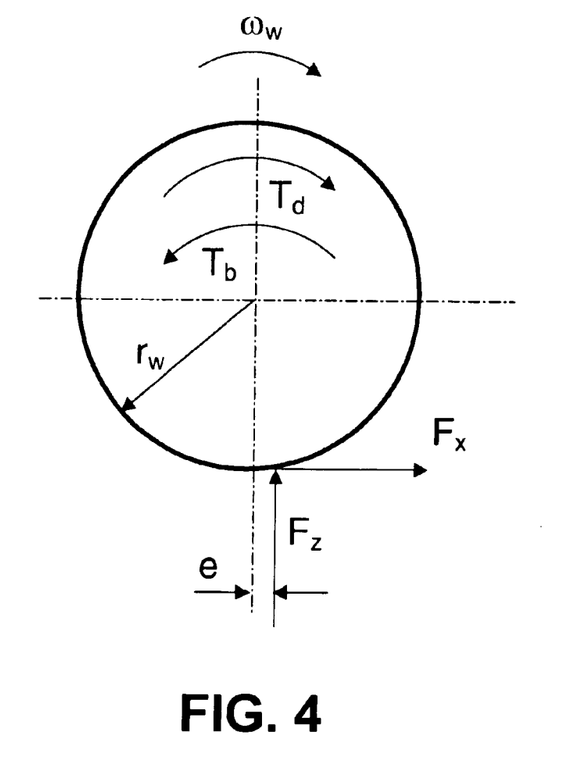
FIG. 4 illustrates forces and torques affecting wheel rotation of a vehicle.

The forces and torques affecting wheel rotation are illustrated in FIG. 4. The equation of motion may be expressed as:

$$I_w \dot{\omega}_w = T_d - T_b - eF_z - F_x r_w \quad (7)$$

where $I_w$ is a wheel rotary moment of inertia, $\omega_w$ is the wheel rotational speed, $T_d$ is the drive torque applied to the wheel, $T_b$ is the brake torque, $F_z$ is the vertical force, $F_x$ is the longitudinal force, $r_w$ is the tire radius, and e is the offset of vertical force from the wheel centerline. If the drive and/or brake torques are estimated (e.g., by power train or brake controllers) and the wheel acceleration is estimated from wheel speed, the tire longitudinal force may be determined from equation (7) as a function of known variables:

$$F_x = \frac{T_d - T_b - eF_z - I_w \dot{\omega}_w}{r_w} \quad (8)$$

It should be noted that the determination of lateral forces per tire and longitudinal forces may depend on the vertical tire forces, although in the latter case this dependency is weak, as the term $eF_z$ is usually small. However, calculation of the longitudinal forces does not depend on the lateral forces and calculation of lateral forces may be only weakly dependent on longitudinal forces (only in the case when differential braking is taken into account). Thus, the order of calculating longitudinal and lateral tire forces may be arbitrary.

Figure 5:
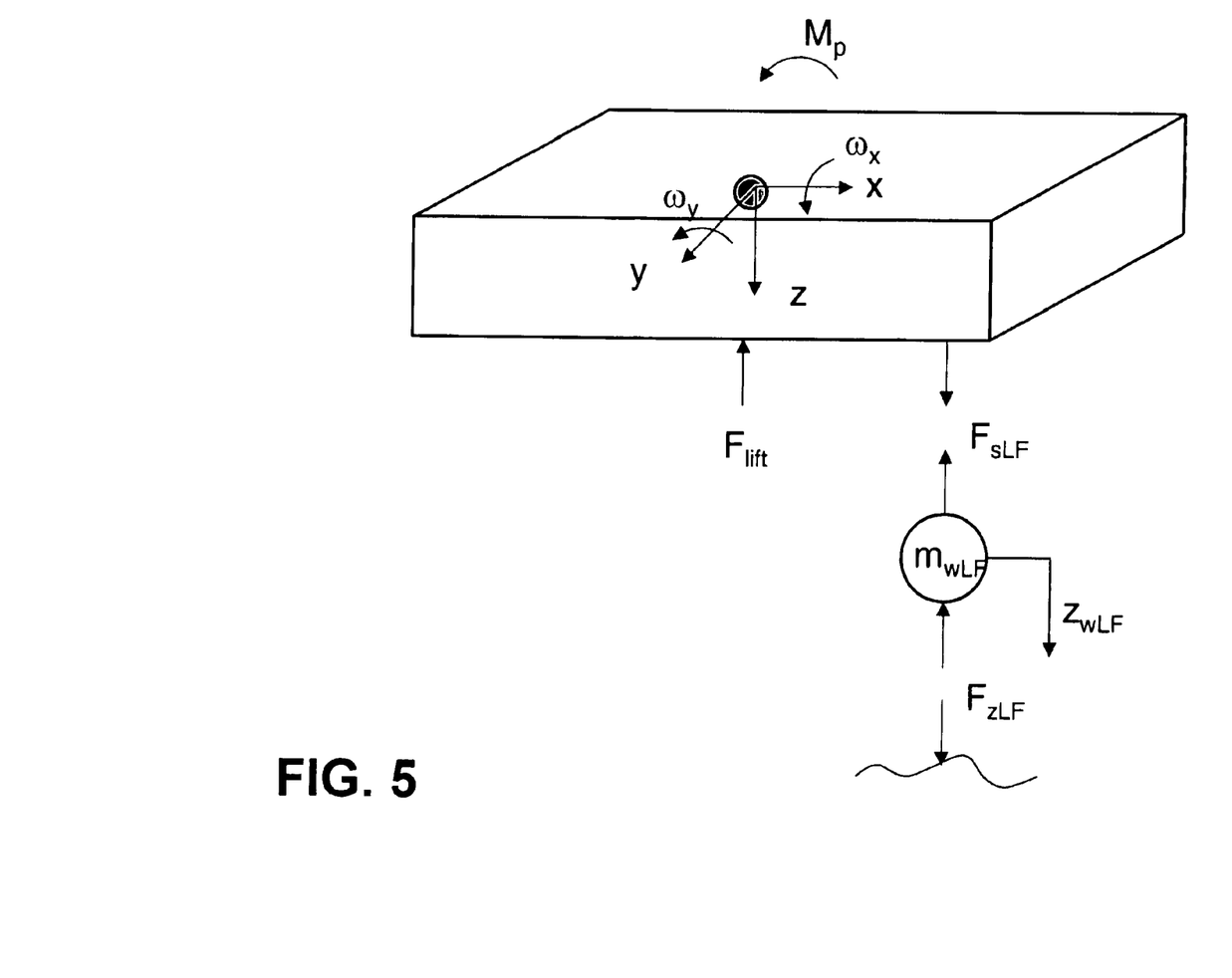
FIG. 5 illustrates a simplified diagram of forces acting upon a vehicle body and one wheel.

In the algorithm, the determination of dynamic tire lateral forces may be extrapolated to the full car model. FIG. 5 illustrates a simplified diagram of forces acting upon a vehicle body and one wheel. The vehicle body may be subjected to four (or more or less) suspension forces and a number of forces and moments (comprising aerodynamic and inertial forces and moments), which in the quarter car model were lumped as a single force, $F_m$. Specifically, the following forces may act on vehicle body: four suspension forces in four corners; gravity force; aerodynamic lift force, $F_{lift}$; aerodynamic pitch moment, $M_p$; longitudinal, lateral, and vertical inertial forces, $ma_x$, $ma_y$, $ma_z$; and roll, pitch and yaw inertial moments, $I_{xx}\omega_x$, $I_{yy}\omega_y$, $I_{zz}\omega_z$. All these forces and moments are now included in the described algorithm.

Referring again to FIG. 2, in one embodiment, the algorithm may be divided into the following steps:

A plurality of measured vehicle variables is determined (step 101). The variables may comprise receiving and filtering the following measured sensor information: body longitudinal acceleration, $a_x$, body lateral acceleration, $a_y$, body vertical acceleration, $a_{zb}$, wheel vertical accelerations, $a_{zwLF}$, $a_{zwRF}$, $a_{zwLR}$, $a_{zwRR}$, body roll rate, $\omega_x$, body pitch rate, $\omega_y$, and yaw rate, $\omega_z$, wheel speeds $\omega_{wLF}$, $\omega_{wLR}$, $\omega_{wRF}$, $\omega_{wRR}$. The roll, pitch, and yaw rates may be differentiated (i.e., in practice, high-pass filtered) to obtain the roll, pitch, and yaw accelerations. Also, the wheel speeds may be differentiated to obtain wheel angular accelerations.

It may be assumed that the body accelerations are determined by accelerometers placed at or close to a vehicle center of gravity. If accelerometers measuring wheel vertical accelerations are not available, but wheel to body relative velocities are obtained from suspension sensors, then the wheel vertical accelerations may be determined by adding the time derivatives of wheel relative velocities to the vertical accelerations of body corners at the wheel location. The latter values may be obtained from the measured vertical acceleration at the body center of mass and the roll and pitch rates. This may yield the following expressions for wheel vertical accelerations:

$$a_{zwLF} = a_{zb} - a_b\dot{\omega}_y + t_w\dot{\omega}_x/2 + \dot{v}_{relLF} \tag{9a}$$

$$a_{zwRF} = a_{zb} - a_b\dot{\omega}_y - t_w\dot{\omega}_x/2 + \dot{v}_{relRR} \tag{9b}$$

$$a_{zwLR} = a_{zb} - b_b\dot{\omega}_y + t_w\dot{\omega}_x/2 + \dot{v}_{RELR} \tag{9c}$$

$$a_{zwRR} = a_{zb} - b_b\dot{\omega}_y - t_w\dot{\omega}_x/2 + \dot{v}_{relRR} \tag{9d}$$

where $a_b$ and $b_b$ are the distances of vehicle body center of gravity to the front and rear axles, respectively, and $t_w$ is the track width (assumed the same for front and rear axles).

At least one suspension force is determined based on at least one of the measured vehicle variables (step 102). Suspension forces may be determined using linear and rotational vehicle body accelerations and optionally the estimates of aerodynamic lift force and pitch moment. The suspension forces (in the vertical direction) may be calculated as follows:

$$F_{sLF} = -\frac{m_b h_r}{(1+\eta)t_w}a_y - \frac{I_{xx}}{(1+\eta)t_w}\dot{\omega}_x + \frac{m_b h}{2L}a_x - \frac{I_{yy}}{2L}\dot{\omega}_y + \frac{M_p}{2L} + \frac{m_b b_b}{2L}a_{zb} + \frac{b_b}{2L}F_{lift} \tag{10a}$$

$$F_{sRF} = -\frac{m_b h_r}{(1+\eta)t_w}a_y + \frac{I_{xx}}{(1+\eta)t_w}\dot{\omega}_x + \frac{m_b h}{2L}a_x - \frac{I_{yy}}{2L}\dot{\omega}_y + \frac{M_p}{2L} + \frac{m_b b_b}{2L}a_{zb} + \frac{b_b}{2L}F_{lift} \tag{10b}$$

$$F_{sLR} = -\frac{m_b h_r \eta}{(1+\eta)t_w}a_y - \frac{I_{xx}\eta}{(1+\eta)t_w}\dot{\omega}_x + \frac{m_b h}{2L}a_x + \frac{I_{yy}}{2L}\dot{\omega}_y - \frac{M_p}{2L} - \frac{m_b a_b}{2L}a_{zb} - \frac{a_b}{2L}F_{lift} \tag{10c}$$

$$F_{sRR} = -\frac{m_b h_r \eta}{(1+\eta)t_w}a_y + \frac{I_{xx}\eta}{(1+\eta)t_w}\dot{\omega}_x - \frac{m_b h}{2L}a_x + \frac{I_{yy}}{2L}\dot{\omega}_y - \frac{M_p}{2L} + \frac{m_b a_b}{2L}a_{zb} + \frac{a_b}{2L}F_{lift} \tag{10d}$$

where $m_b$ is the total sprung (body) mass, $I_{xx}$ and $II_y$ are the body moments of inertia about the roll and pitch axes, respectively, h is the height of vehicle body center of gravity above ground, $h_r$ is the height of body center of gravity above the roll axis, ab and $b_b$ are distances of vehicle body center of gravity from front and rear axle, respectively, $L = a_b + b_b$ is the vehicle wheel-base, and $t_w$ is the track width (it is assumed the same at front and rear). Furthermore, $\eta$ represents the ratio of rear to front suspension roll stiffness (including suspension springs and roll bars). $M_p$ and $F_{lift}$ are the estimated aerodynamic pitch moment and lift force, respectively, which may be determined in a manner known to those skilled in art using vehicle speed and known aerodynamic pitch and lift coefficients for a particular vehicle. The variables $a_x$, $a_y$, and $a_{zb}$ denote the measured body accelerations in the longitudinal, lateral, and vertical directions, including the effects of gravity components. The variables $\omega_x$, $\omega_y$, and $\omega_z$ are the rates of rotation of vehicle body about the roll, pitch, and yaw axes, wherein the dot denotes a derivative with respect to time. In practice, time derivatives may be approximated by high pass filters. Note that the effects of road inclinations on suspension forces may be accounted for in measured accelerations.

The vehicle mass and moments of inertia used in the above equations may represent the nominal values; these may correspond, for example, to a vehicle with a driver and one passenger. However, these parameters may optionally be updated by determining a parameter adaptation that estimates vehicle loading conditions (step 102b).

At least one tire vertical force is determined based on the suspension force and at least one of the measured vehicle variables (step 103). The vertical forces may be determined using the suspension forces determined in step 102 and measured vertical accelerations of the wheels expressed as follows:

$$F_{zLF} = -F_{sLF} - m_{wf}a_{zwLF} \tag{11a}$$

$$F_{zRF} = -F_{sRF} - m_{wf}a_{zwRF} \tag{11b}$$

$$F_{zLR} = -F_{sLR} - m_{wr}a_{zwLR} \tag{11C}$$

$$F_{zRR} = -F_{sRR} - m_{wr}a_{zwRR} \tag{11D}$$

where $m_{wf}$ and $m_{rw}$ denote the unsprung masses of front and rear wheel assemblies, and $a_{zwij}$ refer to the measured vertical accelerations of LF, RF, LR and RR wheels. These accelerations include the gravity acceleration.

If wheel accelerations are not available, then the last terms in equations (11) may be deleted and the vertical forces are equal to negatives of suspension forces (i.e., the negative sign is due to assumed sign convention). However, in this case, the body mass $m_b$ in equations (10) may be replaced by the total vehicle mass, m, and the distances h, $h_r$, a, and b defined with respect to vehicle center of gravity, rather than the vehicle body center of gravity (in practice, the difference in location of both centers is small).

At least one tire longitudinal force is determined based on at least one of the measured vehicle variables (step 104).

Longitudinal tire forces may be determined using measured wheel speeds and estimated driving, braking, tire rolling resistance torques. The equations used for this purpose may be expressed as follows:

$$F_{xLF} = \frac{T_{dLF} - T_{bLF} - eF_{zLF} - I_{wf}\dot{\omega}_{wLF}}{r_{wf}} \quad (12a)$$

$$F_{xRF} = \frac{T_{dRF} - T_{bRF} - eF_{zRF} - I_{wf}\dot{\omega}_{wRF}}{r_{wf}} \quad (12b)$$

$$F_{xLR} = \frac{T_{dLR} - T_{bLR} - eF_{zLR} - I_{wf}\dot{\omega}_{wLR}}{r_{wr}} \quad (12c)$$

$$F_{xRR} = \frac{T_{dRR} - T_{bRR} - eF_{zRR} - I_{wr}\dot{\omega}_{wRR}}{r_{wr}} \quad (12d)$$

where $T_d$ is the estimated drive torque, $T_b$ denotes the estimated brake torque, $eF_z$ represents the moment due to rolling resistance, $I_w$ is the rotary inertia of the wheel (f-front, r-rear), $\omega_w$ is the measured wheel rotational speed, and $r_w$ is the wheel radius. Note that the rolling resistance moment is a function of vertical load, but may also depend on vehicle speed, or may be a constant if lesser accuracy is acceptable.

At least one axle lateral force is determined based on at least one of the measured vehicle variables (step 105). Lateral forces per axle may be determined using the measured lateral acceleration and roll rate and known vehicle parameters according to:

$$F_{yf} = \frac{mba_y + I_{zz}\dot{\omega}_z}{L} \quad (13a)$$

$$F_{yr} = \frac{maa_y - I_{zz}\dot{\omega}_z}{L} \quad (13b)$$

where m is the total mass of vehicle, $I_{zz}$ is vehicle moment of inertia about the vertical axis, $F_{yf}$ and $F_{yr}$ are the front and rear axle lateral forces, $a_y$ is measured lateral acceleration (which includes the gravity component due to road inclination), $\dot{\omega}_z$ is the yaw acceleration (obtained through differentiation of measured yaw rate), a and b are the distances of vehicle center of mass to front and rear axle, respectively, and L=a+b is vehicle wheelbase. The accuracy of the above equations may be improved by including the effect of differential braking and the effect of steering angle if the steering angle measurement is available. In this case the equations may be expressed as follows:

$$F_{yf} = \frac{mba_y + I_{zz}\dot{\omega}_z - (F_{sLF} + F_{sRF})b\sin\delta - 0.5[(F_{xLF} - F_{xRF})\cos\delta + (F_{sLR} - F_{xRR})]t_w}{L\cos\delta} \quad (14a)$$

$$F_{yr} = \frac{maa_y - I_{zz}\dot{\omega}_z - (F_{xLF} + F_{sRF})a\sin\delta + 0.5[(F_{xLF} - F_{xRF})\cos\delta + (F_{sLR} - F_{xRR})]t_w}{L\cos\delta} \quad (14b)$$

At least one tire lateral force is determined based on the axle lateral force and the tire vertical force (step 106). Individual tire lateral forces may be determined using the lateral forces per axle determined in step 105 and the vertical tire forces determined in step 103.

$$F_{yLF} = F_{yf} \frac{F_{zLF}[F_{zof} + \varepsilon(F_{zof} - F_{zLF})]}{F_{zLF}[F_{zof} + \varepsilon(F_{zof} - F_{zLF})] + F_{zRF}[F_{zof} + \varepsilon(F_{zof} - F_{zRF})]} \quad (15a)$$

$$F_{yRF} = F_{yf} \frac{F_{zRF}[F_{zof} + \varepsilon(F_{zof} - F_{zRF})]}{F_{zLF}[F_{zof} + \varepsilon(F_{zof} - F_{zLF})] + F_{zRF}[F_{zof} + \varepsilon(F_{zof} - F_{zRF})]} \quad (15b)$$

$$F_{yLR} = F_{yr} \frac{F_{zLR}[F_{zor} + \varepsilon(F_{zor} - F_{zLR})]}{F_{zLR}[F_{zor} + \varepsilon(F_{zor} - F_{zLR})] + F_{zRR}[F_{zor} + \varepsilon(F_{zor} - F_{zRR})]} \quad (15c)$$

$$F_{yRR} = F_{yr} \frac{F_{zRR}[F_{zor} + \varepsilon(F_{zor} - F_{zRR})]}{F_{zLR}[F_{zor} + \varepsilon(F_{zor} - F_{zLR})] + F_{zRR}[F_{zor} + \varepsilon(F_{zor} - F_{zRR})]} \quad (15d)$$

where $F_{zof}$ and $F_{zor}$ are the nominal static tire vertical forces for a front and rear tires, respectively. The coefficient, $\varepsilon$, is a constant that describes sensitivity of tire lateral forces to the changes in vertical load. A typical value of $\varepsilon$ may be about 0.3.

Note that when $\varepsilon=0$, the tire lateral forces on the left and right side of vehicle become proportional to vertical loads. That is, equations (15) simplify to:

$$F_{yLF} = F_{yf} \frac{F_{zLF}}{F_{zLF} + F_{zRF}} \quad (16a)$$

$$F_{yRF} = F_{yf} \frac{F_{zRF}}{F_{zLF} + F_{zRF}} \quad (16b)$$

$$F_{yLR} = F_{yr} \frac{F_{zLR}}{F_{zLR} + F_{zRR}} \quad (16c)$$

$$F_{yRR} = F_{yr} \frac{F_{zRR}}{F_{zLR} + F_{zRR}} \quad (16d)$$

The equations (16) are the simplified versions of equations (15) and may be used when less accuracy is acceptable or when the tire sensitivity coefficient, $\varepsilon$, is small.

At least one control component of the VCS is modulated based on the tire forces determinations (e.g., the tire vertical, longitudinal, and lateral forces; step 107). In one embodiment, the VCS may modulate one or more control component algorithm(s) of a chassis controllable suspension, an ABS, a TCS, a VSE, an active rear steering system, and an anti-rollover system based on the determined tire force determinations. In another embodiment, the VCS may modulate one or more control component algorithm(s) influencing vehicle comfort, handling, stability, or various other factors based on the determined tire forces. One skilled in the art will understand modulation of one or more control components of a VCS.

The algorithm described herein relies on the knowledge of vehicle parameters related to inertial properties and the location of vehicle center of mass. These parameters may vary to some extent with vehicle payload. The robustness of the algorithm described herein may further be improved if the parameters such as mass, moments of inertia, and location of center of mass are adapted to vehicle payload.

An example of a method that permits estimation of vehicle payload using roll rate, pitch rate, lateral, and longitudinal acceleration sensors and may be adapted for use with the present invention is disclosed in U.S. patent application Ser. No. 10/440,604, filed May 19, 2003, the entirety of which is hereby incorporated by reference. In this method, a payload parameter, w, is determined. The value of this vehicle payload parameter varies from 0 to 1, with 0 corresponding to a vehicle with a driver only and 1 corresponding to a vehicle with the driver and a full payload. Vehicle parameters used herein, such as mass, moments of inertia and distances of center of gravity, may be either known or may be determined for the two extreme cases of loading, that is, for the vehicle with the driver only and for the vehicle with the driver and full payload. Consequently, each one of the vehicle actual parameters may be updated during vehicle operation by using the parameter, w, to interpolate between the two extreme values. For example, if vehicle body mass, $m_b$, is $m_{bempty}$ for a vehicle with driver only and $m_{bloaded}$ for vehicle with full payload, then the actual body mass may be determined as follows:

$$m_b = m_{bempty}(1-w) + m b_{bloaded} w \qquad (17)$$

Analogous equations apply to the other parameters.

Figure 6:
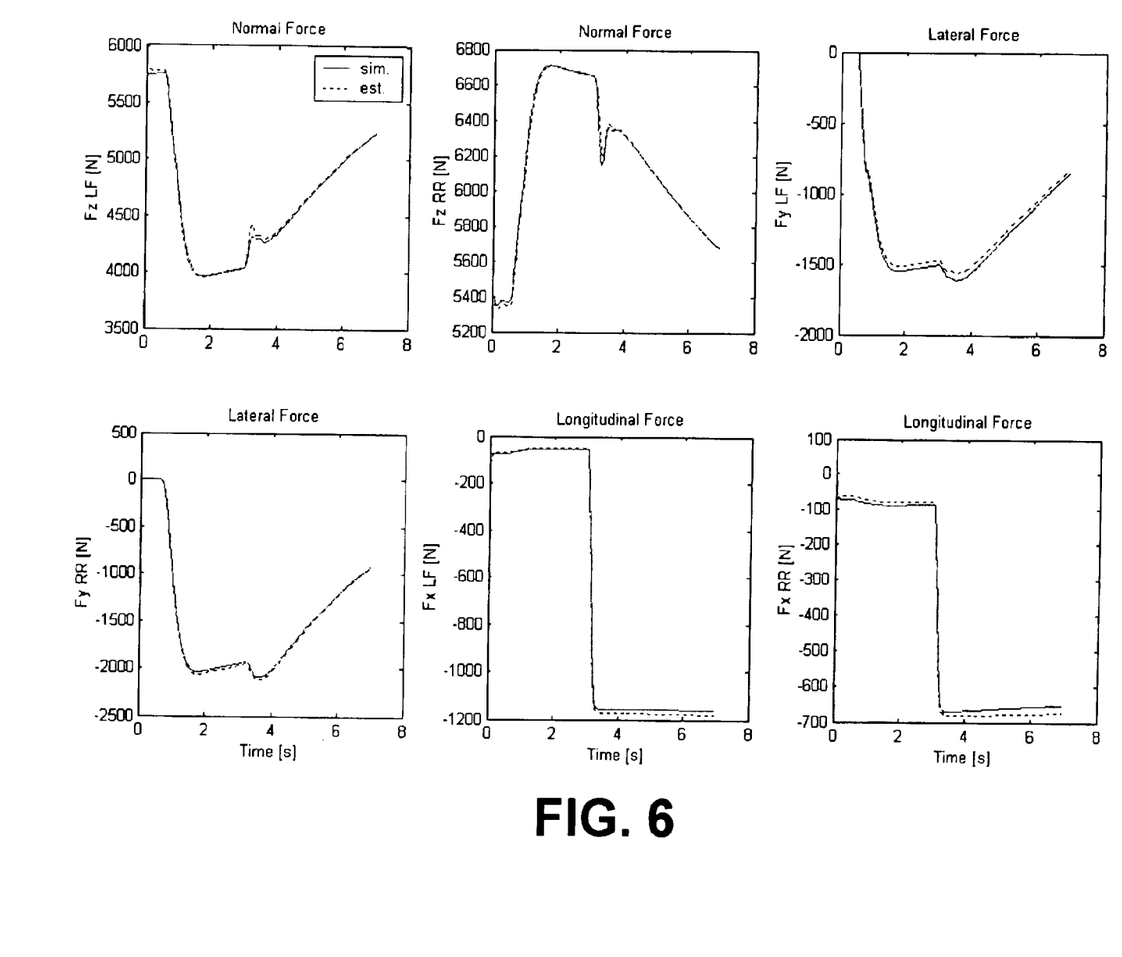
FIG. 6 illustrates a detailed full vehicle model comparison of simulated tire forces to estimations derived from the algorithm of FIG. 2.

FIG. 6 illustrates a detailed full vehicle model comparison of simulated (solid lines) tire forces to estimations (dashed lines) derived from the algorithm. The results were obtained for a cornering and braking maneuver performed on a smooth, dry road surface. Steering was initiated half a second into the maneuver and braking at three seconds. The resulting tire forces in three directions for left front and right rear tires are shown.

Figure 7:
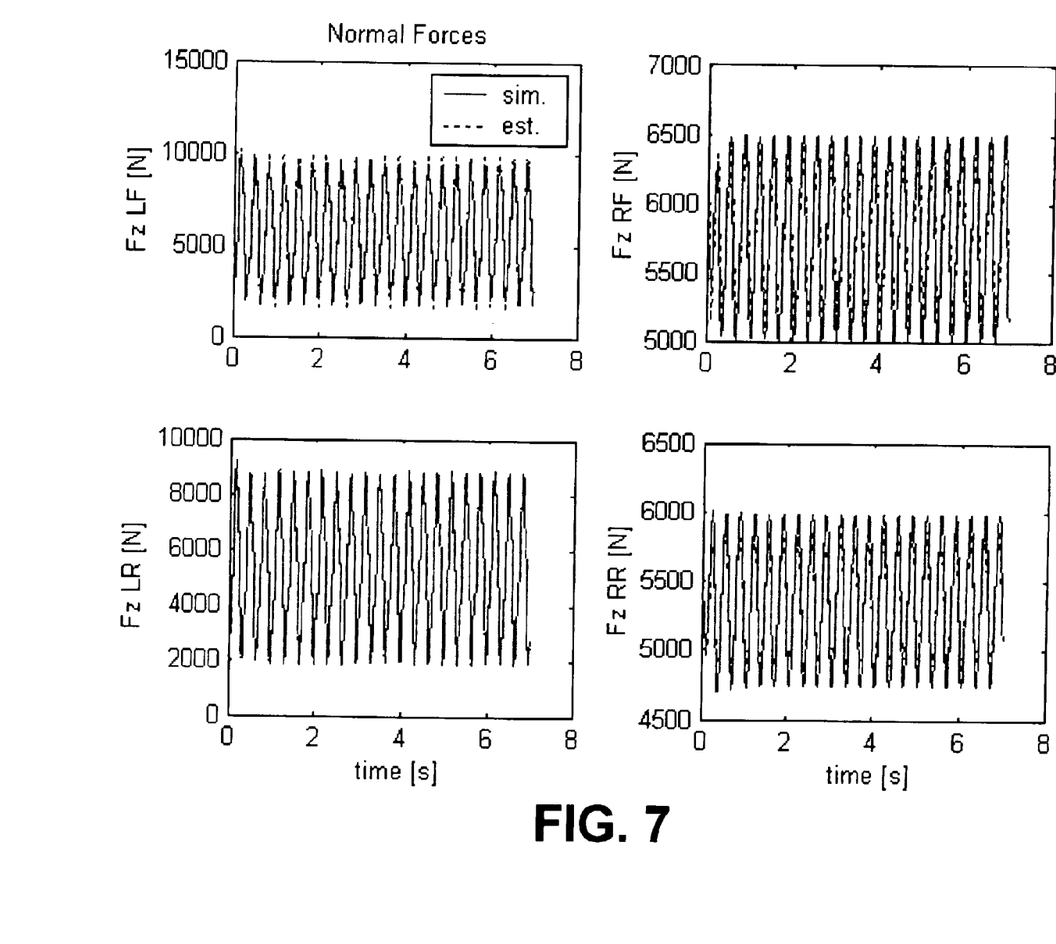
FIG. 7 illustrates a comparison of simulated vertical tire force to estimations derived from the algorithm of FIG. 2 during driving on a rough road surface.

FIG. 7 illustrates a comparison of simulated (solid lines) vertical tire force to estimations (dashed lines) derived from the algorithm during driving on a rough road surface. A sinusoidal road input of frequency 3 Hertz and amplitude of 2.5 cm (about 1 inch) was applied to the left wheel.

While the embodiments of the invention disclosed herein are presently considered to be preferred, various changes and modifications may be made without departing from the spirit and scope of the invention. For example, the vehicle and method of determining dynamic tire forces are not limited to any particular design, configuration, sequence, or arrangement. The sensors, and controller configuration, size, shape, geometry, location, orientation, number, and function may vary without limiting the utility of the invention. Furthermore, the method may be accomplished by numerous alternative strategies, may include additional steps, and vary in step order.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A method of operating a vehicle control system, the method comprising:

determining a plurality of measured vehicle variables;

determining at least one suspension force based on at least one of the determined measured vehicle variables;

determining at least one tire vertical force based on the at least one determined suspension force and at least one of the determined measured vehicle variables;

determining at least one tire longitudinal force based on at least one of the determined measured vehicle variables;

determining at least one axle lateral force based on at least one of the determined measured vehicle variables;

determining at least one tire lateral force based on the at least one determined axle lateral force and the at least one determined tire vertical force; and modulating at least one control component of the vehicle control system based on the at least one determined tire vertical force, the at least one determined tire longitudinal force, and the at least one determined tire lateral force.

2. The method of claim 1 wherein the measured vehicle variables comprise at least one variable selected from a group consisting of longitudinal acceleration, lateral acceleration, vertical acceleration, wheel vertical acceleration, roll rate, pitch rate, yaw rate, wheel speed, steering angle, brake torque, drive torque, and vehicle speed.

3. The method of claim 1 wherein determining a plurality of measured vehicle variables comprises sensing at least one of acceleration, speed, torque, inertia, yaw, rotation, and angle.

4. The method of claim 1 wherein the control component comprises at least one of a controllable suspension, an anti-lock braking system, a traction control system, a vehicle stability enhancement system, an active rear steering system, and an anti-rollover system.

5. The method of claim 1 further comprising determining a parameter adaptation.

6. The method of claim 5 wherein the parameter adaptation comprises a vehicle load condition estimate.

7. A computer usable medium including a program for operating a vehicle control system, the computer usable medium comprising:

computer readable program code for determining a plurality of measured vehicle variables;

computer readable program code for determining at least one suspension force based on at least one of the determined measured vehicle variables;

computer readable program code for determining at least one tire vertical force based on the at least one determined suspension force and at least one of the determined measured vehicle variables;

computer readable program code for determining at least one tire longitudinal force based on at least one of the determined measured vehicle variables;

computer readable program code for determining at least one axle lateral force based on at least one of the determined measured vehicle variables;

computer readable program code for determining at least one tire lateral force based on the at least one determined axle lateral force and the at least one determined tire vertical force; and computer readable program code for modulating at least one control component of the vehicle control system based on the at least one determined tire vertical force, the at least one determined tire longitudinal force, and the at least one determined tire lateral force.

8. The computer usable medium of claim 7 wherein the measured vehicle variables comprise at least one variable selected from a group consisting of longitudinal acceleration, lateral acceleration, vertical acceleration, wheel vertical acceleration, roll rate, pitch rate, yaw rate, wheel speed, steering angle, brake torque, drive torque, and vehicle speed.

9. The computer usable medium of claim 7 wherein the control component comprises at least one of a controllable suspension, an anti-lock braking system, a traction control system, a vehicle stability enhancement system, an active rear steering system, and an anti-rollover system.

10. The computer usable medium of claim 7 further comprising computer readable program code for determining the dynamic tire forces for a plurality of vehicle wheels.

11. The computer usable medium of claim 7 further comprising computer readable program code for determining a parameter adaptation.

12. The computer usable medium of claim 11 wherein the parameter adaptation comprises a vehicle load condition estimate.

13. A vehicle control system comprising:
- means for determining a plurality of measured vehicle variables;
- means for determining at least one suspension force based on at least one of the determined measured vehicle variables;
- means for determining at least one tire vertical force based on the at least one determined suspension force and at least one of the determined measured vehicle variables;
- means for determining at least one tire longitudinal force based on at least one of the determined measured vehicle variables;
- means for determining at least one axle lateral force based on at least one of the determined measured vehicle variables;
- means for determining at least one tire lateral force based on the at least one determined axle lateral force and the at least one determined tire vertical force; and
- means for modulating at least one control component of the vehicle control system based on the at least one determined tire vertical force, the at least one determined tire longitudinal force, and the at least one determined tire lateral force.

14. The system of claim 13 wherein the means for determining a plurality of measured vehicle variables comprises means for sensing at least one of acceleration, speed, torque, inertia, yaw, rotation, and angle.

15. The system of claim 13 wherein the control component comprises at least one of a controllable suspension, an anti-lock braking system, a traction control system, a vehicle stability enhancement system, an active rear steering system, and an anti-rollover system.

16. The system of claim 13 further comprising means for determining dynamic tires forces for a plurality of vehicle wheels.

17. The system of claim 13 further comprising means for determining a parameter adaptation.

18. The system of claim 17 wherein the means for the parameter adaptation comprises means for estimating a vehicle load condition.

* * * * *